US012166348B2

United States Patent
Nakano et al.

(10) Patent No.: US 12,166,348 B2
(45) Date of Patent: Dec. 10, 2024

(54) MANAGEMENT SYSTEM AND MANAGEMENT METHOD FOR MANAGING PARTS IN MANUFACTURING MADE FROM RENEWABLE ENERGY

(71) Applicant: Hitachi, Ltd., Tokyo (JP)

(72) Inventors: Michiki Nakano, Tokyo (JP); Hiroshi Mine, Tokyo (JP)

(73) Assignee: HITACHI, LTD., Tokyo (JP)

( * ) Notice: Subject to any disclaimer, the term of this patent is extended or adjusted under 35 U.S.C. 154(b) by 340 days.

(21) Appl. No.: 17/712,239

(22) Filed: Apr. 4, 2022

(65) Prior Publication Data

US 2022/0344935 A1 Oct. 27, 2022

(30) Foreign Application Priority Data

Apr. 22, 2021 (JP) .................................. 2021-072600

(51) Int. Cl.
*G05B 19/418* (2006.01)
*H02J 3/00* (2006.01)

(52) U.S. Cl.
CPC .......... *H02J 3/003* (2020.01); *G05B 19/4188* (2013.01); *H02J 2300/20* (2020.01)

(58) Field of Classification Search
CPC .................................................. H02J 2300/20
See application file for complete search history.

(56) References Cited

U.S. PATENT DOCUMENTS

2012/0123953 A1* 5/2012 Jabara .................. G06Q 30/018
705/317
2013/0311216 A1* 11/2013 Rothley ................. G06Q 10/08
705/7.11

(Continued)

FOREIGN PATENT DOCUMENTS

JP 2007-148726 A 6/2007
JP 2020-170484 A 10/2020

(Continued)

OTHER PUBLICATIONS

Extended European Search Report received in corresponding European Application No. 22164937.9 dated Sep. 13, 2022.

*Primary Examiner* — Nathan L Laughlin
(74) *Attorney, Agent, or Firm* — MATTINGLY & MALUR, PC

(57) ABSTRACT

It is provided a management system for managing renewable energy verification comprising: an arithmetic device configured to execute predetermined processing; a storage device coupled to the arithmetic device, an input unit configured to receive a supply ratio of renewable energy in a manufacturing process, and input quantities of a renewable energy-derived raw material and a renewable energy-derived part out of raw materials and parts input to the manufacturing process; and an RE verification granting module configured to calculate, with use of the received input about the supply ratio of renewable energy and about the input quantities of the renewable energy-derived raw material and the renewable energy-derived part, at least one of the number of pieces to be granted renewable energy verification out of pieces of a manufactured item manufactured by the manufacturing process, or a ratio of pieces of the manufactured item that are to be granted renewable energy verification.

10 Claims, 6 Drawing Sheets

(56) References Cited

U.S. PATENT DOCUMENTS

| | | | | |
|---|---|---|---|---|
| 2020/0334751 A1* | 10/2020 | Lagge | .................... | G06Q 50/06 |
| 2022/0366103 A1* | 11/2022 | B R | ....................... | G06Q 10/06 |
| 2023/0006847 A1* | 1/2023 | Mayuzumi | ................ | H04L 9/50 |
| 2023/0016373 A1* | 1/2023 | Kasamatsu | ............ | G06Q 50/06 |

FOREIGN PATENT DOCUMENTS

| | | |
|---|---|---|
| WO | 2012/066651 A1 | 5/2012 |
| WO | 2014/065111 A1 | 5/2014 |

* cited by examiner

| | 1021 | 1022 | 1023 | 1024 |
|---|---|---|---|---|
| | DATE | PROCESS ID | ELECTRIC POWER CONSUMPTION AMOUNT(kWh) | RENEWABLE ENERGY RATIO (%) |
| | 2021/03/05 | PROCESS A | 20 | 20 |
| | 2021/03/05 | PROCESS B | 70 | 40 |
| | 2021/03/05 | PROCESS C | 100 | 30 |
| | 2021/03/05 | PROCESS D | 120 | 0 |

ELECTRIC POWER CONSUMPTION DATA

*Fig. 2*

| 1031 | 1032 | 1033 | 1034 |
|---|---|---|---|
| PROCESS ID | MANUFACTURED ITEM TYPE ID | COMPONENT TYPE ID | COMPOSITION AMOUNT |
| PROCESS C | MANUFACTURED ITEM C | MANUFACTURED ITEM A | 1 |
| PROCESS C | MANUFACTURED ITEM C | MANUFACTURED ITEM B | 2 |
| PROCESS B | MANUFACTURED ITEM B | ... | ... |
| PROCESS B | MANUFACTURED ITEM B | ... | ... |

CONFIGURATION DATA

*Fig. 3*

| DATE | MANUFACTURED ITEM TYPE ID | RE VERIFICATION COUNT | RE VERIFICATION RATIO | PROCESS RENEWABLE ENERGY RATIO | COMPONENT RE VERIFICATION QUANTITY |
|---|---|---|---|---|---|
| 2021/03/05 | MANUFACTURED ITEM C | 30 PIECES | 20% | 30% | MANUFACTURED ITEM A: c PIECES |
| 2021/03/05 | MANUFACTURED ITEM A | 30 PIECES | 15% | 20% | MANUFACTURED ITEM B: d PIECES |
| 2021/03/05 | ... | ... | ... | ... | MANUFACTURED ITEM X: a PIECES |
| 2021/03/05 | ... | ... | ... | ... | ... |
| 2021/03/05 | MANUFACTURED ITEM Y | 20 PIECES | 50% | 60% | — |

RE VERIFICATION CO2 EMISSION AMOUNT DATA

Fig. 5

| DATE | MANUFACTURED ITEM TYPE ID | RE VERIFICATION COUNT | RE VERIFICATION RATIO | PROCESS RENEWABLE ENERGY RATIO | COMPONENT RE VERIFICATION QUANTITY | COMPONENT $CO_2$ EMISSION AMOUNT |
|---|---|---|---|---|---|---|
| 2021/03/05 | MANUFACTURED ITEM C | 30 PIECES | 20% | 30% | MANUFACTURED ITEM A: c PIECES MANUFACTURED ITEM B: d PIECES | MANUFACTURED ITEM A: x t-$CO_2$ MANUFACTURED ITEM B: y t-$CO_2$ |
| 2021/03/05 | MANUFACTURED ITEM A | 30 PIECES | 15% | 20% | MANUFACTURED ITEM X: a PIECES | — |
| 2021/03/05 | ... | ... | ... | ... | | — |
| 2021/03/05 | ... | ... | ... | ... | | — |
| 2021/03/05 | MANUFACTURED ITEM Y | 20 PIECES | 50% | 60% | — | MANUFACTURED ITEM Z: z t-$CO_2$ |

RE VERIFICATION $CO_2$ EMISSION AMOUNT DATA

Fig. 7

MANAGEMENT SYSTEM AND MANAGEMENT METHOD FOR MANAGING PARTS IN MANUFACTURING MADE FROM RENEWABLE ENERGY

CLAIM OF PRIORITY

The present application claims priority from Japanese patent application JP 2021-72600 filed on Apr. 22, 2021, the content of which is hereby incorporated by reference into this application.

BACKGROUND OF THE INVENTION

This invention relates to a management system which manages whether a manufactured item is derived from renewable energy, and verifies that the manufactured item is renewable energy-derived.

As the background art in a technical field of this invention, JP 2007-148726 A is known. In JP 2007-148726 A, there is described a manufacturing plant energy consumption analysis system in which a requested amount of each power or substance required for motivity is extracted for each manufacturing apparatus from input data in time series (a processing module 5), a requested amount of each required motivity power/substance is extracted for each process class in time series (a processing module 6), a time-series total requested amount is calculated for each required motivity power/substance from the apparatus-by-apparatus, or process class-by-process class, requested amount of each required motivity power/substance, and a time-series energy consumption amount is calculated based on energy data (a processing module 7), and pro rata calculation of the energy consumption amount is executed with the use of proportions of the apparatus-by-apparatus requested amount of each required motivity power/substance and the process class-by-process class requested amount of each required motivity power/substance to the calculated time-series total requested amount, to thereby calculate an individual energy consumption amount for supplying each required motivity power/substance for each apparatus and for each process class, and execute energy consumption analysis processing including transitions of a required motivity power/substance load and transitions of the energy consumption amount (a processing module 8).

According to the technology as described in JP 2007-148726 A, an energy consumption amount of a whole manufacturing plant including utility apparatus can be analyzed with ease based on a lot flow of manufacturing apparatus, and not only review and planning of energy saving but also management of a ratio at which renewable energy has been used in a manufacturing process of a manufactured item is possible. However, it is difficult with the technology as described in JP 2007-148726 A to execute management for ensuring that a manufactured item is manufactured with the use of energy derived from renewable energy, and verify the use of renewable energy in the manufacture, in a manufacturing process that does not involve strict management of an association relationship between a manufacturing apparatus out of a plurality of manufacturing apparatus and a manufactured item out of a plurality of manufacturing items.

SUMMARY OF THE INVENTION

This invention has been made in view of this problem, and an object of this invention is therefore to provide a system and a method which are capable of executing management for ensuring that a manufactured item as well as parts and raw materials of the manufactured item is manufactured with electric power derived from renewable energy, and verification of a fact that a manufactured item as well as parts and raw materials of the manufactured item is manufactured with electric power derived from renewable energy, even in a manufacturing process that does not involve strict management of an association relationship between a manufacturing apparatus and a manufactured item.

The representative one of inventions disclosed in this application is outlined as follows. A management system for managing renewable energy verification of a manufactured item, the management system comprising: an arithmetic device configured to execute predetermined processing; a storage device coupled to the arithmetic device, an input unit configured to receive a supply ratio of renewable energy in a manufacturing process, and input quantities of a renewable energy-derived raw material and a renewable energy-derived part out of raw materials and parts input to the manufacturing process; and an RE verification granting module configured to calculate, with use of the received input about the supply ratio of renewable energy and about the input quantities of the renewable energy-derived raw material and the renewable energy-derived part, at least one of the number of pieces to be granted renewable energy verification out of pieces of a manufactured item manufactured by the manufacturing process, or a ratio of pieces of the manufactured item that are to be granted renewable energy verification.

According to the at least one aspect of this invention, it is possible to execute the management for ensuring that a manufactured item as well as parts and raw materials of the manufactured item is manufactured with the electric power derived from renewable energy, and the verification of the fact that a manufactured item as well as parts and raw materials of the manufactured item is manufactured with the electric power derived from renewable energy. Problems, configurations, and effects other than those described above are clarified by the following description of at least one embodiment of this invention.

BRIEF DESCRIPTION OF THE DRAWINGS

FIG. 2 is a table for illustrating a configuration example of electric power consumption data according to the first embodiment of this invention.

FIG. 3 is a table for illustrating a configuration example of configuration data according to the first embodiment of this invention.

FIG. 5 is a table for illustrating a configuration example of RE verification data according to the first embodiment of this invention.

FIG. 7 is a diagram for illustrating a configuration example of RE verification $CO_2$ emission amount data according to a second embodiment of this invention.

DETAILED DESCRIPTION OF THE PREFERRED EMBODIMENTS

A description is now given below of at least one embodiment of this invention with reference to the drawings.

First Embodiment

In a first embodiment of this invention, a description is given of an example of a system for managing a proportion of renewable energy to electric power supplied to a manufacturing line in which an association relationship between a manufacturing apparatus and a manufactured item is not strictly managed, and proportions at which raw materials and parts input to this manufacturing line are manufactured with electric power derived from renewable energy, and for guaranteeing that a manufactured item of the manufacturing line has been manufactured with renewable energy-derived power. The first embodiment is applicable not only to a manufacturing line of a tangible item but also to development of software, which is an intangible item.

Figure 1:
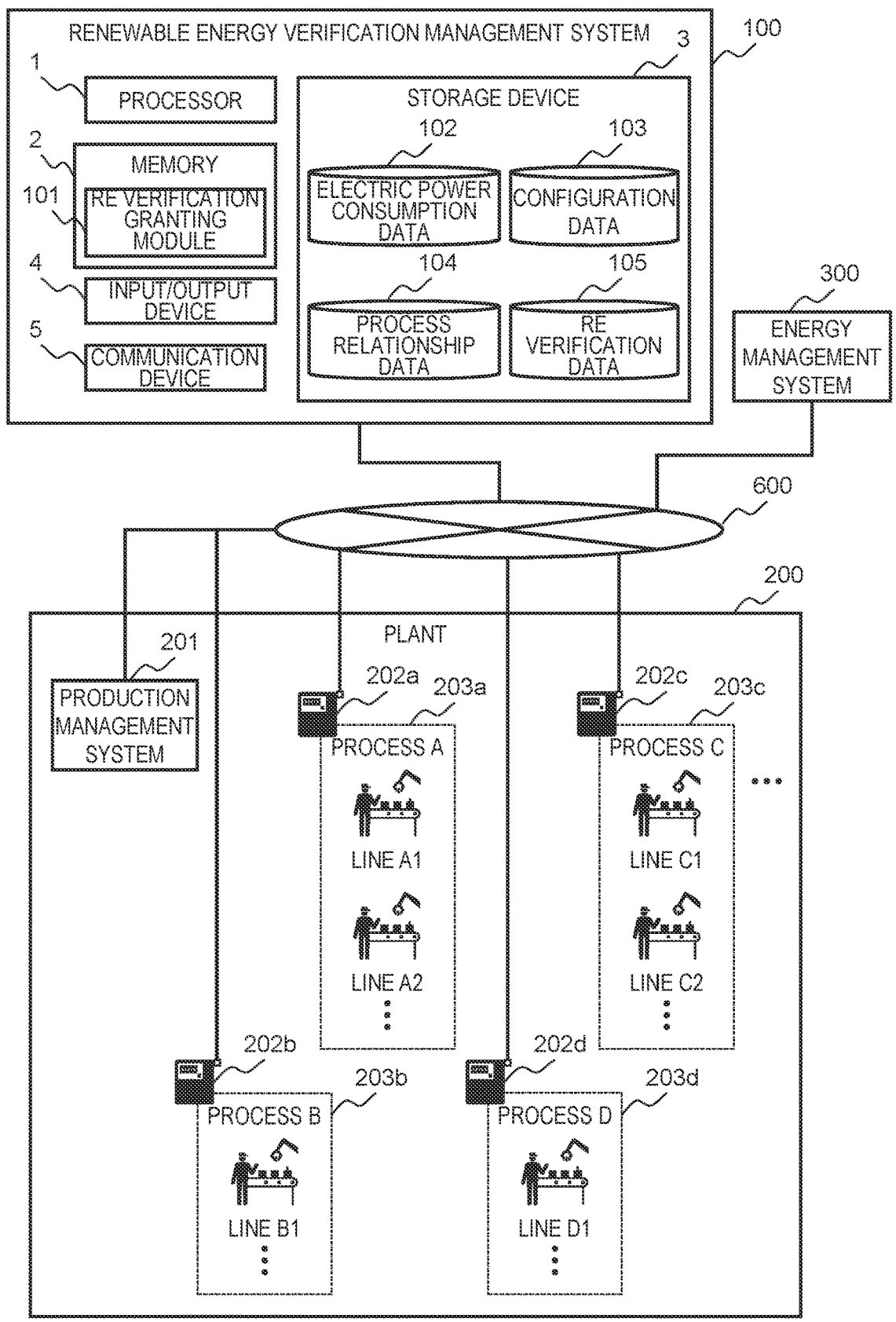
FIG. 1 is a block diagram for illustrating an example of a renewable energy verification management system according to a first embodiment of this invention.

FIG. 1 is a block diagram for illustrating an example of a renewable energy verification management system 100 according to the first embodiment of this invention.

The renewable energy verification management system 100 is coupled, via a network 600, to a production management system 201 for managing a production situation of a plant 200, electric power meters 202a, 202b, 202c, and 202d each for measuring electric power consumption of a process, and an energy management system 300. The electric power meters 202a, 202b, 202c, and 202d measure an amount of electric power consumed in processes 203a, 203b, 203c, and 203d, respectively. The renewable energy verification management system 100 collects, from the production management system 201, an input quantity of each of raw materials, parts, and the like in each process and a production amount of a manufactured item in each process, collects, from the electric power meters 202a, 202b, 202c, and 202d, electric power consumption amounts of the processes 203a, 203b, 203c, and 203d, and collects, from the energy management system 300, information about a ratio of renewable energy to energy supplied to each process in the plant 200.

The renewable energy verification management system 100 is a computer including a processor 1, a memory 2, a storage device 3, an input/output device 4, and a communication device 5.

The processor 1 is an arithmetic device for executing a program stored in the memory 2. Part of processing carried out by the processor 1 by executing programs may be executed by another arithmetic device (for example, ASIC, FPGA, or a similar piece of hardware). The processor 1 executes processing in accordance with programs of function modules, to thereby operate as the function modules which provide predetermined functions. For example, the processor 1 functions as an RE verification granting module 101 by executing processing in accordance with an RE verification granting program. The same applies to other programs. The renewable energy verification management system 100 is a computer and a computer system that include function modules implemented by the processor 1.

The memory 2 includes a ROM, which is a non-volatile storage element, and a RAM, which is a volatile storage element. The ROM stores an unchanging program (for example, BIOS) among others. The RAM is a dynamic random access memory (DRAM) or a similar high-speed and volatile storage element, and temporarily stores a program executed by the processor 1 and data used when the program is executed. For example, the RE verification granting module 101 is loaded as a program onto the memory 2 to be executed by the processor 1.

The storage device 3 is a large-capacity and non-volatile storage device, such as a magnetic storage device (an HDD), or a flash memory (an SSD). The storage device 3 stores data used by the processor 1 when the processor 1 executes a program (for example, electric power consumption data 102, configuration data 103, process relationship data 104, and RE verification data 105), and programs executed by the processor 1. In other words, a program is read out of the storage device 3, loaded onto the memory 2, and executed by the processor 1.

The RE verification granting module 101 receives an input quantity of each of raw materials, parts, and the like of the processes 203 from the production management system 201, and receives electric power consumption amounts from the electric power meters 202.

The renewable energy verification management system 100 may include an input interface and an output interface. The input interface is an interface to which a keyboard and a mouse, or other input device are coupled to receive input from an operator. The output interface is an interface to which a display device and a printer (not shown) or other output device are coupled to output a result of executing a program in a format visually recognizable to the operator. Other device coupled to the renewable energy verification management system 100 via the network 600 may provide an input device and an output device.

A program executed by the processor 1 is provided via a removable medium (a CD-ROM, a flash memory, or the like) or the network 600 to the renewable energy verification management system 100, and is stored in the non-volatile storage device 3 which is a non-transitory storage medium. It is therefore recommended that the renewable energy verification management system 100 include an interface through which data is read out of a removable medium.

The renewable energy verification management system 100 is a computer system configured on a single physical computer or on a plurality of logically or physically configured computers, and may operate on a virtual machine built on a plurality of physical computer resources. For example, sub-programs forming the RE verification granting module 101 may operate on separate physical or logical computers, or may be broken into combinations of a plurality of sub-programs so that each of the combinations operates on a single physical or logical computer.

FIG. 2 is a table for illustrating a configuration example of the electric power consumption data 102.

The electric power consumption data 102 includes a date 1021, a process 1022, an electric power consumption amount 1023, and a renewable energy ratio 1024 in one record. A ratio of renewable energy to electric power consumption amounts of the processes measured by the electric power meters 202 is stored in the electric power consumption data 102. The date 1021 is, for example, data indicating a predetermined time range (for example, one day long or an hour long). The process 1022 is an identifier of a process, and the electric power consumption amount 1023 is an amount of electric power consumed in one of the processes 203. The renewable energy ratio 1024 is a proportion of energy derived from renewable energy in the amount of electric power consumed in the one of the processes 203. The renewable energy ratio 1024 can be collected from the energy management system 300. For example, on Mar. 5, 2021, a total electric power consumption amount of Process A is 20 kWh and the renewable energy ratio thereto is 20%, which means that 4 kWh of electric power has been supplied by renewable energy.

FIG. 3 is a table for illustrating a configuration example of the configuration data 103.

The configuration data 103 includes a process ID 1031, a manufactured item type ID 1032, a component type ID 1033, and a composition quantity 1034 in one record. The process ID 1031 is an identifier indicating a process type. The manufactured item type ID 1032 is an identifier indicating a type of a manufactured item, such as a model number or a model code of a product. The component type ID 1033 is an identifier indicating a type of a raw material, a part, or a manufactured item, or the like that is used to manufacture the manufactured item of interest. The composition quantity 1034 is a quantity by which the component of interest is used in the manufacture of the manufactured item of interest, and is expressed in, for example, the number of pieces or capacity. In other words, the composition quantity 1034 may be managed by the number of pieces as with parts, or may be managed by capacity as with liquids and gasses. The quantity of a component included in the manufactured item is utilized in RE verification granting processing. RE verification indicates that a manufactured item is manufactured with the use of renewable energy (RE). An upper limit of generation of the manufactured item can be calculated by dividing the quantity of the input raw material or part by the composition quantity 1034. When the quantity of a renewable energy-derived raw material or part out of input raw materials and parts is known, calculation of an upper limit of the number of pieces to which RE verification can be granted is possible. A guarantee that the manufactured item is renewable energy-derived can be given by granting RE verification to a number of pieces that does not exceed this upper limit.

Figure 4:
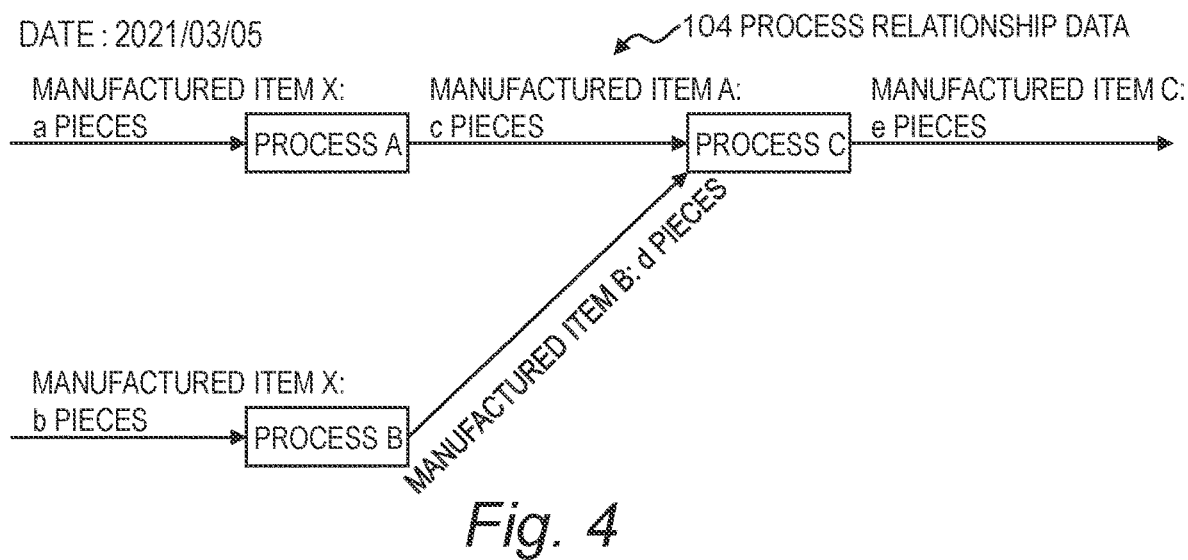
FIG. 4 is a diagram for illustrating a configuration example of process relationship data according to the first embodiment of this invention.

FIG. 4 is a diagram for illustrating a configuration example of the process relationship data 104.

The process relationship data 104 is used to manage the total quantity of pieces flagged with a renewable energy-derived manufacture flag out of pieces of a manufactured item flowing from one process to another process at one date. For example, of Manufactured Item X input to Process A as a part, a pieces are a renewable energy-derived manufactured item, and c pieces out of Manufactured Item A, which is a product manufactured in Process A, are flagged with the renewable energy-derived manufacture flag before input to Process C. Similarly, of Manufactured Item X input to Process B as a part, b pieces are a renewable energy-derived manufactured item, and d pieces out of Manufactured Item B, which is a product manufactured in Process B, are flagged with the renewable energy-derived manufacture flag before input to Process C. In this manner, a quantity of flow of a manufactured item to which RE verification can be granted is managed for each process, to thereby prevent granting RE verification to more than a quantity of item that can be manufactured from input RE-verified raw materials and parts.

FIG. 5 is a table for illustrating a configuration example of the RE verification data 105.

The RE verification data 105 includes a date 1051, a manufactured item type ID 1052, an RE verification count 1053, an RE verification ratio 1054, a process renewable energy ratio 1055, and a component RE verification quantity 1056 in one record.

The date 1051 is data indicating a period (for example, one day long or an hour long) that is a target of tallying. The manufactured item type ID 1052 is an identifier indicating a type of a manufactured item, such as a model number or a model code of a product. The RE verification count 1053 is the number of pieces that are verified to be manufactured with energy or components derived from renewable energy out of pieces of a type of manufactured item manufactured in the period indicated by the date 1051. The RE verification ratio 1054 is a proportion of the number of the pieces that are verified to be manufactured with energy or components derived from renewable energy to a total production count of pieces of the type of manufactured item. The process renewable energy ratio 1055 is a proportion of renewable energy to an electric power consumption amount in a process by which the type of manufactured item has been manufactured. The component RE verification quantity 1056 is a total quantity of raw materials, parts, and the like used in the manufacture. Unified management of those pieces of information facilitates confirmation of a fact that RE verification is granted to a number of pieces of a manufactured item within a range in which the manufactured item can be manufactured with supplied renewable energy or from renewable energy-derived parts. Specifically, when the RE verification count 1053 does not exceed the composition RE verification quantity 1056 and the RE verification ratio 1054 does not exceed the process renewable energy ratio 1055, RE verification of the manufactured item is guaranteed to be valid.

For example, when Manufactured Item Y shown in FIG. 5 is manufactured from a material procured from an outside supplier and the material that is a component of Manufactured Item Y does not have RE verification, Manufactured Item Y is guaranteed to have been manufactured with energy or components derived from renewable energy with respect to a process in which 20 pieces of Manufactured Item Y are manufactured. Thus, when a part or a material supplied from an outside supplier who is not a target of the management does not have RE verification, by managing the renewable energy ratio of each process in a plant that is a target of the management with the use of the data shown in FIG. 5, manufacture with energy or components derived from renewable energy can be guaranteed at least in a process that is a target of the management.

Figure 6:
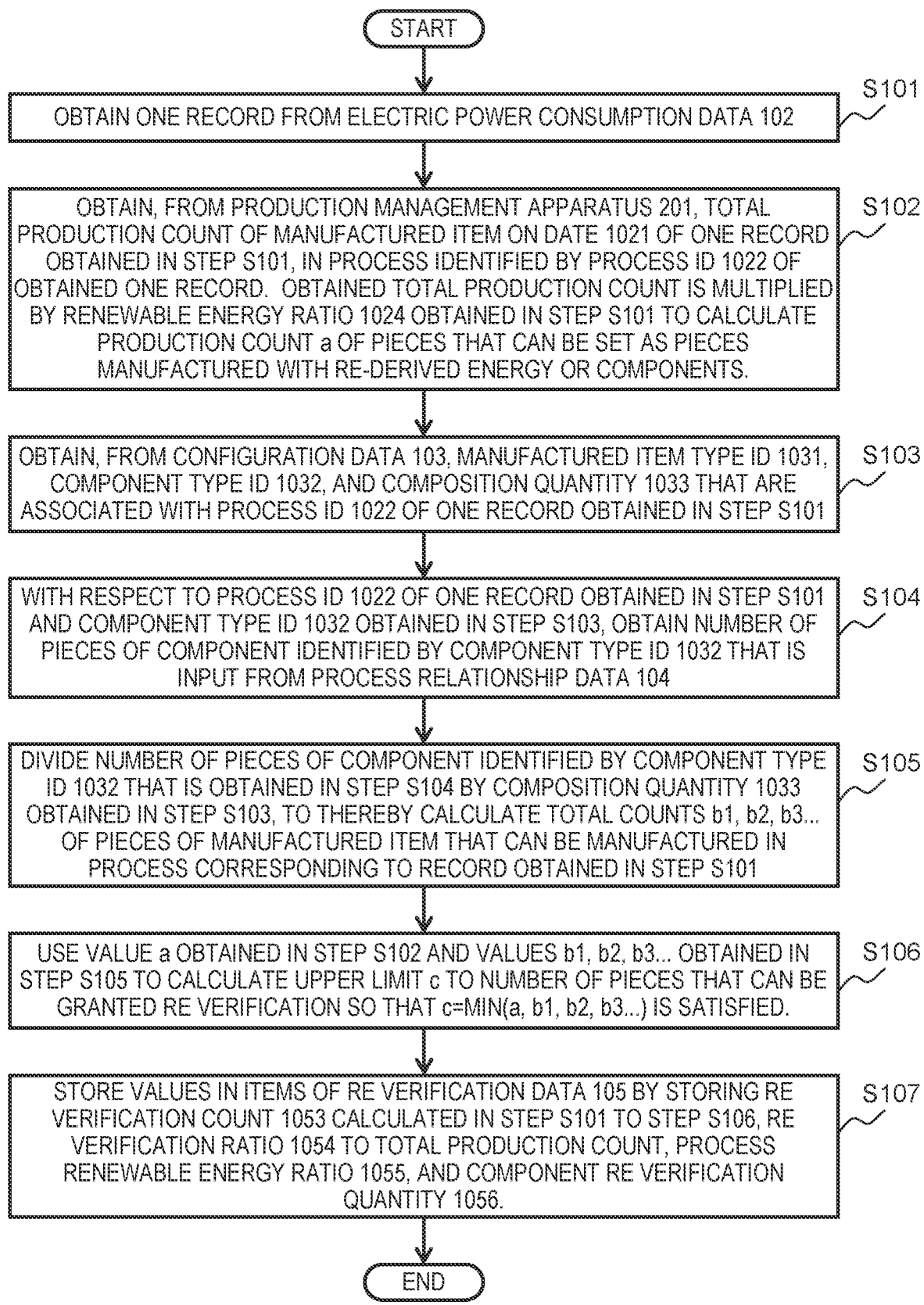
FIG. 6 is a flow chart for illustrating details of RE verification granting processing according to the first embodiment of this invention.

FIG. 6 is a flow chart for illustrating details of RE verification granting processing. The RE verification granting module 101 receives, as input, the electric power consumption data 102, the configuration data 103, the process relationship data 104, and the total production count of pieces of a manufactured item obtained from the production management system 201, and outputs the RE verification data 105.

In Step S101, one record is obtained from the electric power consumption data 102.

In Step S102, with respect to the date 1021 and the process ID 1022 of the one record obtained in Step S101, the total production count of pieces of a manufactured item at the obtained date in a process identified by the obtained process ID is obtained from the production management system 201. The obtained total production count is multiplied by the renewable energy ratio 1024 obtained in Step S101, to thereby calculate a production count a, which can be set as the number of pieces manufactured with energy or components derived from renewable energy.

In Step S103, the manufactured item type ID 1032, the component type ID 1033, and the composition quantity 1034 that are associated with the process ID 1022 of the one record obtained in Step S101 are obtained from the configuration data 103.

In Step S104, the process relationship data 104 is referred to with respect to the process ID 1022 of the one record obtained in Step S101 and the component type ID 1033 obtained in Step S103, to obtain the number of input pieces of a type of component identified by the component type ID 1033.

In Step S105, the number of pieces of the component obtained in Step S104 as the number of pieces of a type of component identified by the component type ID 1033 is divided by the composition quantity 1034 obtained in Step S103, to thereby calculate a total count b of pieces of the manufactured item that can be manufactured in a process corresponding to the record obtained in Step S101. The value b is calculated for each component, and a plurality of values b are calculated in a case of a manufactured item including a plurality of components.

In Step S106, the value a obtained in Step S102 and the value b obtained in Step S105 are substituted in the following expression to calculate an RE verification count c, which is an upper limit to the number of pieces that can be verified as renewable energy-derived. The right-hand side of the following expression means that a smaller value out of the input a and the input b is used.

$$c = \min(a, b)$$

In Step S107, the RE verification count 1053 indicating the number of pieces that have been granted RE verification in Step S101 to Step S106, the RE verification ratio 1054 to the total production count, the process renewable energy ratio 1055, and the component RE verification quantity 1056 are stored as the items of the RE verification data 105.

For example, when 30 pieces of Manufactured Item C shown in FIG. 5 can be granted RE verification and the proportion thereof to the total production count is 20%, the renewable energy ratio in a process by which Manufactured Item C is manufactured is 30%. Accordingly, when 30 pieces are 20% of the total production count, it can be confirmed that energy in a process in which 30 pieces of Manufactured Item C are manufactured is guaranteed to be renewable energy-derived. Manufactured Item C includes c pieces of Manufactured Item A and d pieces of Manufactured Item B, and the total count of pieces of Manufactured Item C that can be manufactured from c pieces of Manufactured Item A and d pieces of Manufactured Item B is calculable from the configuration data 103. When the calculated value of the total count of manufacturable pieces is more than 30, at least 30 pieces of Manufactured Item C including Manufactured Item A and the Manufactured Item B that have been sent from preceding processes can be guaranteed to have been manufactured with energy or components derived from renewable energy. In this manner, RE verification is granted and managed through sequential tracking of components of a manufactured item, to thereby guarantee that the manufactured item has been manufactured with energy or components derived from renewable energy across a plurality of processes, even for manufacturing processes in which an association relationship between a manufacturing apparatus and a manufactured item is not strictly managed. In addition, management of RE verification by quantity instead of piece-by-piece management of RE verification enables guarantee of a fact that a manufactured item has been manufactured with energy or components derived from renewable energy even in an environment that hinders strict management of a relationship among a manufactured item, parts and raw materials that are input, and a manufacturing line.

Second Embodiment

In a second embodiment of this invention, a case of managing a $CO_2$ emission amount of a manufactured item is described. In the second embodiment, RE verification $CO_2$ emission amount data 107 is used in place of the RE verification data 105 (shown in FIG. 5) in the first embodiment. The description given in the second embodiment is about a configuration different from the configuration of the first embodiment described above, and omits a description of the same configuration as the one in the first embodiment.

The RE verification $CO_2$ emission amount data 107 in the second embodiment shown in FIG. 7 is created by adding a component $CO_2$ emission amount 1071 to the RE verification data 105 described in the first embodiment, to thereby manage the $CO_2$ emission amount of a manufactured item. For example, processes of manufacturing Component A and Component B, which are components of Manufactured Item C, may be renewable energy-derived and accordingly zero in $CO_2$ emission amount, but $CO_2$ emission amounts in manufacturing processes of parts or raw materials of Component A or Component B are stored as the component $CO_2$ emission amount 1071. Thus, when a part or a raw material that is procured from an outside supplier and that is not zero in $CO_2$ emission amount is used, management for ensuring that a manufacturing process is renewable energy-derived is enabled by managing the $CO_2$ emission amount of the part or the raw material as shown in FIG. 7. The management shown in FIG. 7 further enables management of the $CO_2$ emission amount of a part or a raw material that is a component, and guarantee of $CO_2$ traceability when a component is not renewable energy-derived.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A management system for managing renewable energy verification of a manufactured item, the management system comprising:
a plurality electric power meters, coupled to a network, measuring an amount of electric power consumed by each of a plurality of manufacturing processes;
a processor coupled to the network;
a storage device coupled to the processor; and
a memory, coupled to the processor, which stores instructions that when executed by the processor, configures the processor to:

receive, via the network, from the plurality of electric power meters, the amount of electric power consumed by each of the plurality of manufacturing processes, receive a ratio of renewable energy for each of the manufacturing processes, and an input quantity of a raw material derived from renewable energy, an input quantity of a part made out of raw materials derived from renewable energy, and an input quantity of parts input to the manufacturing process, determine an amount of renewable energy consumed by each of the manufacturing processes based on the received amount of electric power consumed and the ratio of renewable energy in the manufacturing processes, and calculate, with use of the received input of the ratio of renewable energy and of the input quantity of the raw material derived from renewable energy, and the input quantity of the part made out of raw materials derived from renewable energy, at least one of the number of pieces to be granted renewable energy verification out of pieces of a manufactured item manufactured by the manufacturing process, or a ratio of pieces of the manufactured item that are to be granted renewable energy verification.

2. The management system according to claim 1, wherein the processor is configured to:

calculate, as the number of pieces of the manufactured item that are to be granted renewable energy verification, a smaller value of the number of pieces of the manufactured item that is calculated from the received input about the supply ratio of renewable energy and the number of pieces of the manufactured item that is calculated from the received input of the input quantity of the raw material derived from renewable energy and the input quantity of the part made out of raw materials.

3. The management system according to claim 2, wherein the processor is configured to:

calculate a production count of pieces of the manufactured item that are manufactured with renewable energy by multiplying the ratio of renewable energy in the manufacturing process by a total production count of pieces of the manufactured item in the manufacturing process.

4. The management system according to claim 1, wherein the processor is configured to:

calculate the number of pieces of the manufactured item that are allowed to be granted renewable energy verification in the manufacturing process by dividing quantities of a raw material and a part that are input to the manufacturing process by composition quantities of the raw material and the part in the manufactured item.

5. The management system according to claim 4, wherein the processor is configured to:

calculate the number of pieces of the manufactured item that are allowed to be granted renewable energy verification in the manufacturing process for each of the plurality of types of the raw materials and the parts, in a case where a plurality of types of raw materials and parts are input to the manufacturing process, and calculate a smallest value of the number of pieces of the manufactured item calculated for each of the plurality of types of the raw materials and parts as the number of pieces of the manufactured item that are allowed to be granted renewable energy verification in the manufacturing process.

6. A management method for a management system that manages renewable energy verification of a manufactured item, the management system comprising a plurality electric power meters, coupled to a network, measuring an amount of electric power consumed by each of a plurality of manufacturing processes; a processor coupled to the network; a storage device coupled to the processor, the method executed by the processor and comprising:

receiving, via the network, from the plurality of electric power meters, the amount of electric power consumed by each of the plurality of manufacturing processes;

receiving, a ratio of renewable energy for each of the manufacturing processes, and an input quantity of a raw material derived from renewable energy, an input quantity of a part made out of raw materials derived from renewable energy, and an input quantity of parts input to the manufacturing process; and determining an amount of renewable energy consumed by each of the manufacturing processes based on the received amount of electric power consumed and the ratio of renewable energy in the manufacturing processes; and an RE verification granting step of calculating with use of the received input of the ratio of renewable energy and of the input quantity of the raw material derived from renewable energy, and the input quantity of the part made out of raw materials derived from renewable energy, at least one of the number of pieces to be granted renewable energy verification out of pieces of a manufactured item manufactured by the manufacturing process, or a ratio of pieces of the manufactured item that are to be granted renewable energy verification.

7. The management method according to claim 6, wherein the RE verification granting step comprises calculating as the number of pieces of the manufactured item that are to be granted renewable energy verification, a smaller value of the number of pieces of the manufactured item that is calculated from the received input of the supply ratio of renewable energy and the number of pieces of the manufactured item that is calculated from the received input of the quantity of raw material derived from renewable energy and the input quantity of the part made out of raw materials.

8. The management method according to claim 7, wherein the RE verification granting step comprises calculating a production count of pieces of the manufactured item that are manufactured with renewable energy by multiplying the supply ratio of renewable energy in the manufacturing process by a total production count of pieces of the manufactured item in the manufacturing process.

9. The management method according to claim 6, wherein the RE verification granting step comprises calculating the number of pieces of the manufactured item that are allowed to be granted renewable energy verification in the manufacturing process by dividing quantities of a raw material and a part that are input to the manufacturing process by composition quantities of the raw material and the part in the manufactured item.

10. The management method according to claim 9, wherein the RE verification granting step comprises:

calculating the number of pieces of the manufactured item that are allowed to be granted renewable energy verification in the manufacturing process for each of the plurality of types of the raw materials and the parts, in a case where a plurality of types of raw materials and parts are input to the manufacturing process; and calculating a smallest value of the number of pieces of the manufactured item calculated for each of the plurality of types of the raw materials and parts as the number of pieces of the manufactured item that are allowed to be granted renewable energy verification in the manufacturing process.

* * * * *